United States Patent
Landon et al.

(10) Patent No.: US 10,129,178 B1
(45) Date of Patent: Nov. 13, 2018

(54) COMBINING AND PROCESSING AS A WHOLE PORTIONS OF A ORDERED SEGMENT OF DATA ELEMENTS SPLIT BETWEEN TWO COMMUNICATIONS CHANNELS

(71) Applicant: L-3 Communications Corp., New York, NY (US)

(72) Inventors: David G. Landon, Bountiful, UT (US); Ryan W. Hinton, Erda, UT (US); Kelly D. Griffiths, Bountiful, UT (US)

(73) Assignee: L-3 Communications Corp., New York, NY (US)

( * ) Notice: Subject to any disclaimer, the term of this patent is extended or adjusted under 35 U.S.C. 154(b) by 259 days.

(21) Appl. No.: 14/957,375

(22) Filed: Dec. 2, 2015

(51) Int. Cl.
*H04L 12/933* (2013.01)
*H04L 25/02* (2006.01)
*H04L 25/06* (2006.01)

(52) U.S. Cl.
CPC ........ *H04L 49/103* (2013.01); *H04L 25/0204* (2013.01); *H04L 25/067* (2013.01)

(58) Field of Classification Search
CPC ..... H04L 1/06; H04L 7/0837; H04L 25/0204; H04L 25/067; H04L 7/083; H04L 49/103
See application file for complete search history.

(56) References Cited

U.S. PATENT DOCUMENTS

| | | | |
|---|---|---|---|
| 5,809,043 A | 9/1998 | Hassan et al. | |
| 6,539,367 B1 | 3/2003 | Blanksby et al. | |
| 7,313,752 B2 | 12/2007 | Kyung et al. | |
| 8,266,493 B1 | 9/2012 | Abbaszadeh et al. | |
| 8,719,683 B2 | 5/2014 | Kyung et al. | |
| 9,104,589 B1 | 8/2015 | Landon et al. | |
| 2001/0007561 A1* | 7/2001 | Aznar | H04L 49/3081 370/409 |
| 2002/0188906 A1 | 12/2002 | Kurtas et al. | |
| 2007/0286310 A1* | 12/2007 | Fukuoka | H04B 7/02 375/340 |

(Continued)

FOREIGN PATENT DOCUMENTS

WO    03/058904 A1    7/2003

OTHER PUBLICATIONS

Timmerman et al., "Ground Based High Data Rate DVB-S2 Demodulator for High Data Rate AISR Transport," IEEE (2010), pp. 1558-1563.

(Continued)

*Primary Examiner* — Michael Thier
*Assistant Examiner* — Prince A Mensah
(74) *Attorney, Agent, or Firm* — Kirton McConkie; Brian Tucker

(57) ABSTRACT

A block of ordered data elements comprising a plurality of sub-blocks each of which is to be processed by a different processing module in segments of the data elements having a particular length characteristic can be received in parallel streams on parallel communication channels. The data elements in each stream can be received and directed to the corresponding processing module. The tail of a segment split between two of the streams and received earlier in time than the corresponding head of the split segment can be buffered until the head is received on the other stream. The head and the tail of the split segment can then be processed as a whole segment in a corresponding processing module.

37 Claims, 7 Drawing Sheets

(56) References Cited

U.S. PATENT DOCUMENTS

| | | | |
|---|---|---|---|
| 2008/0151897 A1* | 6/2008 | Nemoto | H04L 49/552 370/392 |
| 2009/0067431 A1* | 3/2009 | Huang | H04L 49/90 370/394 |
| 2011/0057937 A1* | 3/2011 | Wu | G06F 15/8023 345/505 |
| 2011/0167315 A1 | 7/2011 | Kyung et al. | |
| 2014/0344639 A1 | 11/2014 | Kyung et al. | |
| 2017/0034589 A1* | 2/2017 | Rozenberg | H04N 21/64322 |

OTHER PUBLICATIONS

Constellation Mapper and Demapper for WiMAX, Application Note 439, version 1.1, Altera Corp. (May 2007), pp. 1-14.

"Digital Video Broadcasting (DVD); Second generation framing structure, channel coding and modulation systems for Broadcasting, Interactive Services, News Gathering and other broadband satellite applications (DVD-S2)," ETSI EN 302 307 V1.2.1 (Aug. 2009), 78 pages (2009).

Falcao et al., "HDL Library of Processing Units for an Automatic LDPC Decoder Design," IEEE (2006), pp. 349-352.

Rovini et al., "On the Addition of an Input Buffer to an Interactive Decoder for LDPC Codes," IEEE (2007), pp. 1995-1999.

Gomes et al., "HDL Library of Processing Units for Generic and DVD-S2 LDPC Decoding," International Conference on Signal Processing and Multimedia Applications (SIGMAP2006), 2006 (8 pages).

Gomes et al., "Flexible Parallel Architecture for DVB-S2 LDPC Decoders," IEEE (2007), pp. 3265-3269.

U.S. Appl. No. 14/805,155, filed Jul. 21, 2015 (not yet published), which is owned by the same assignee as the instant application.

* cited by examiner

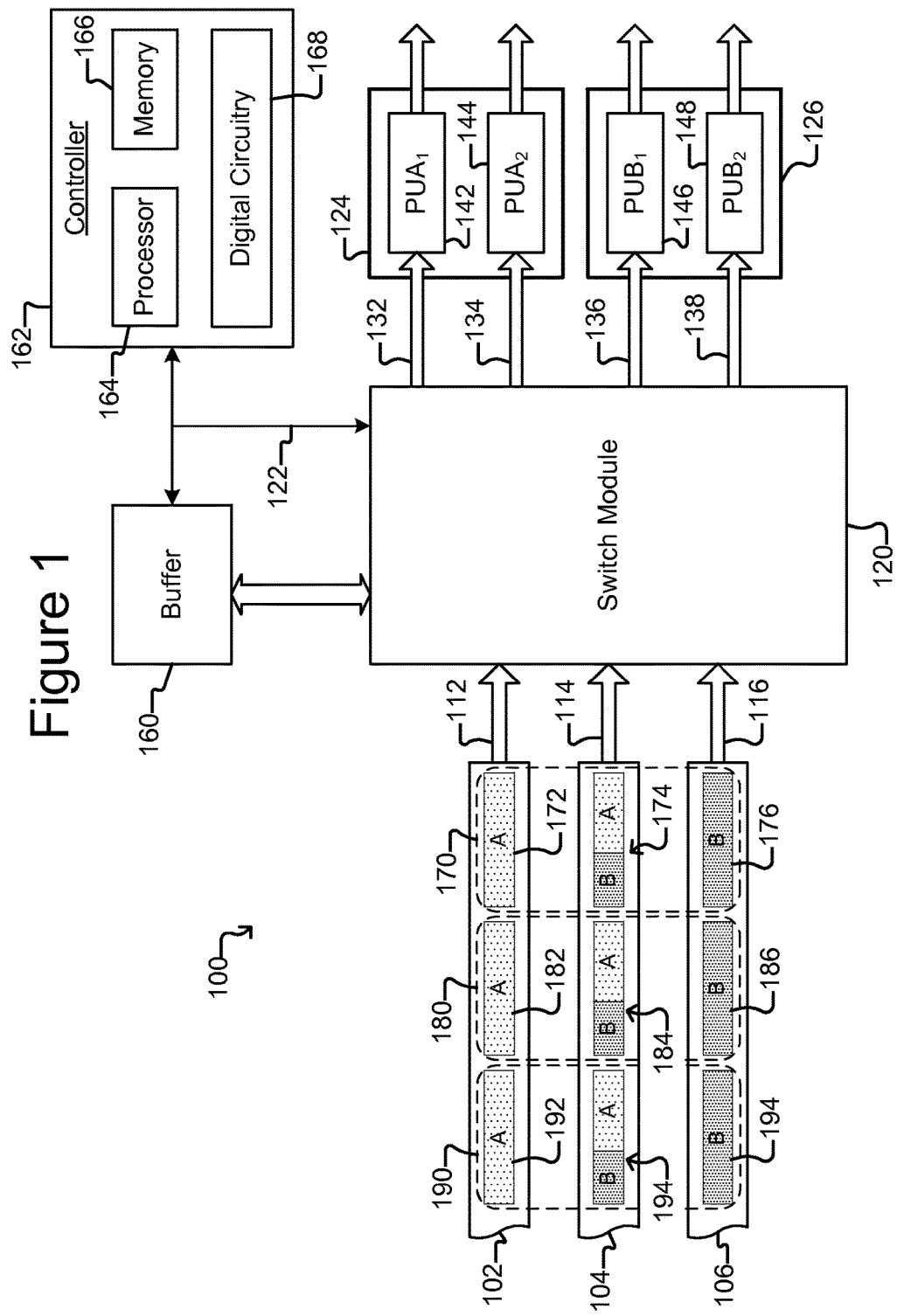

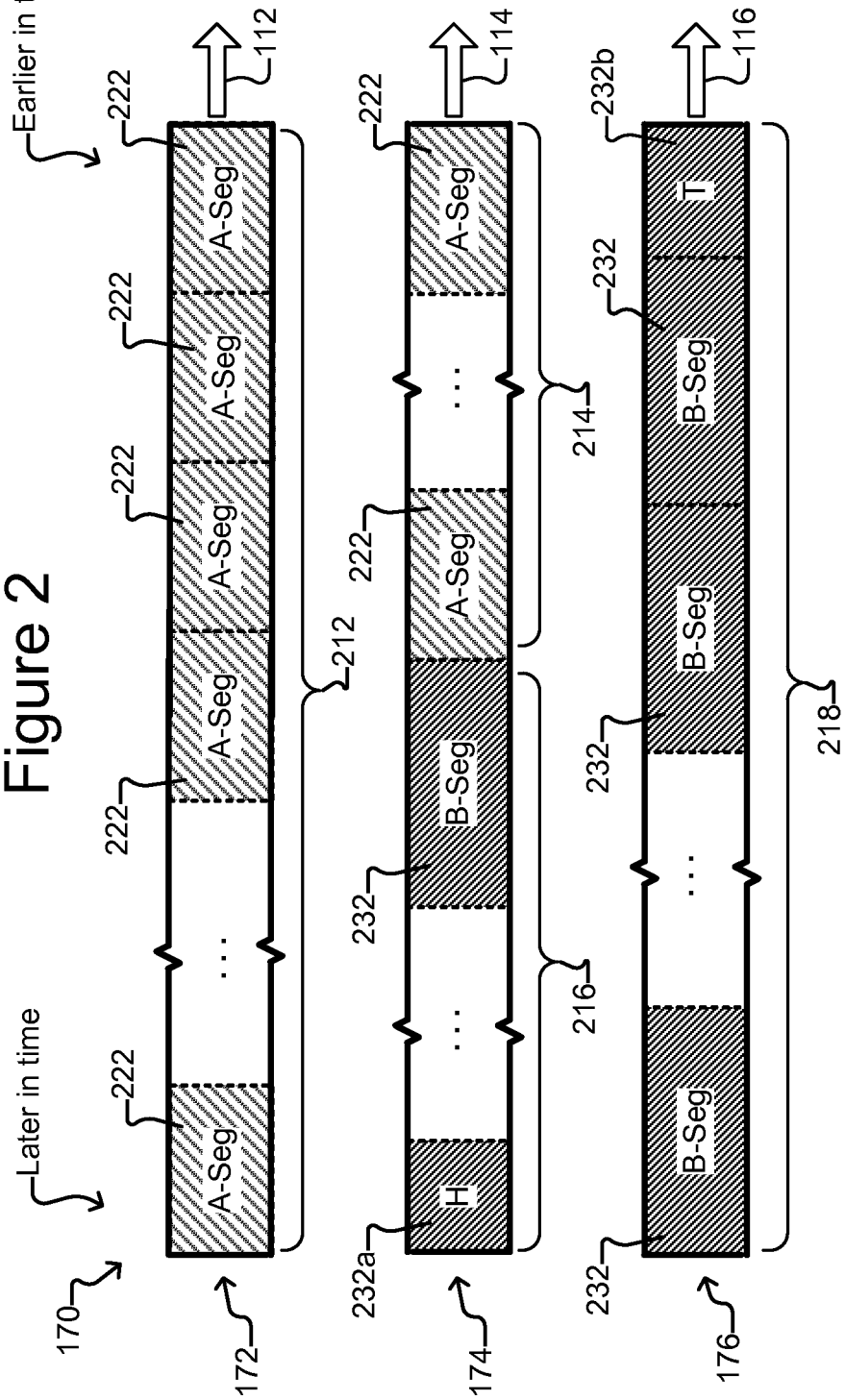

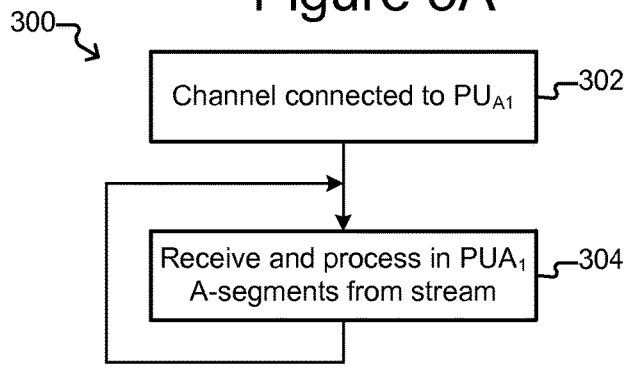
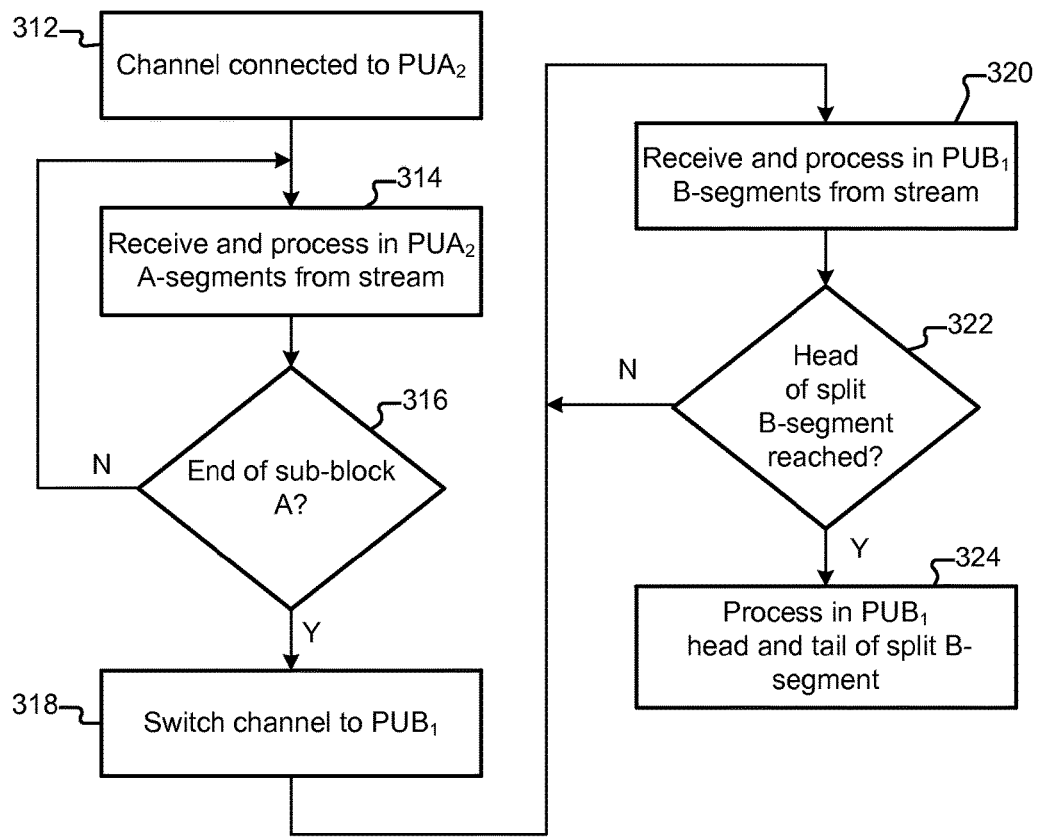

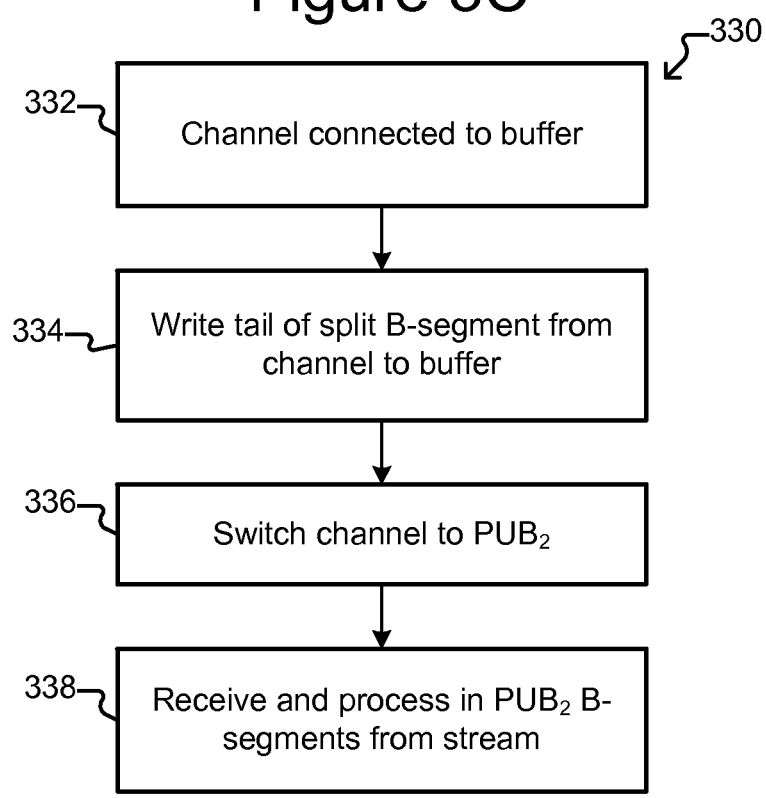

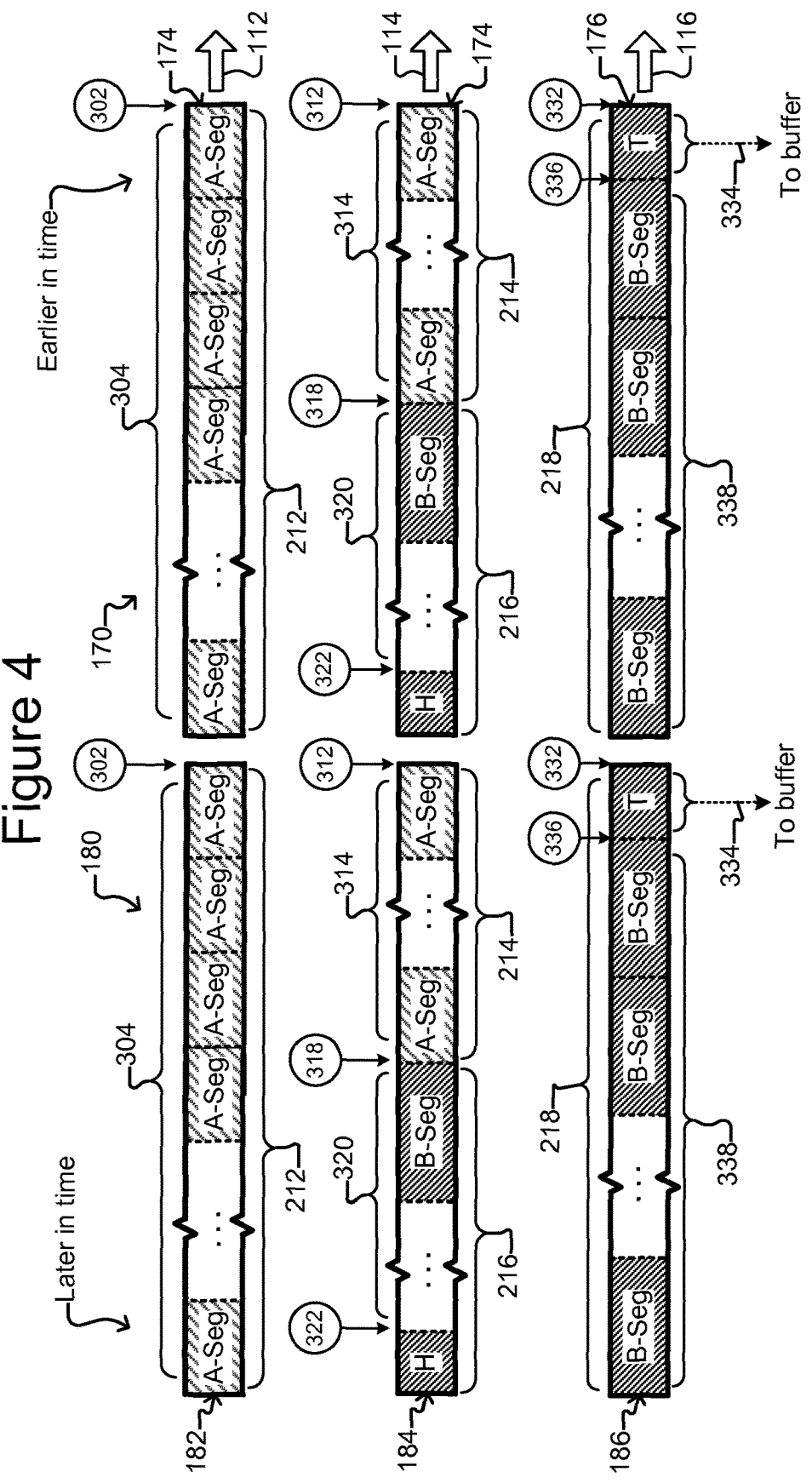

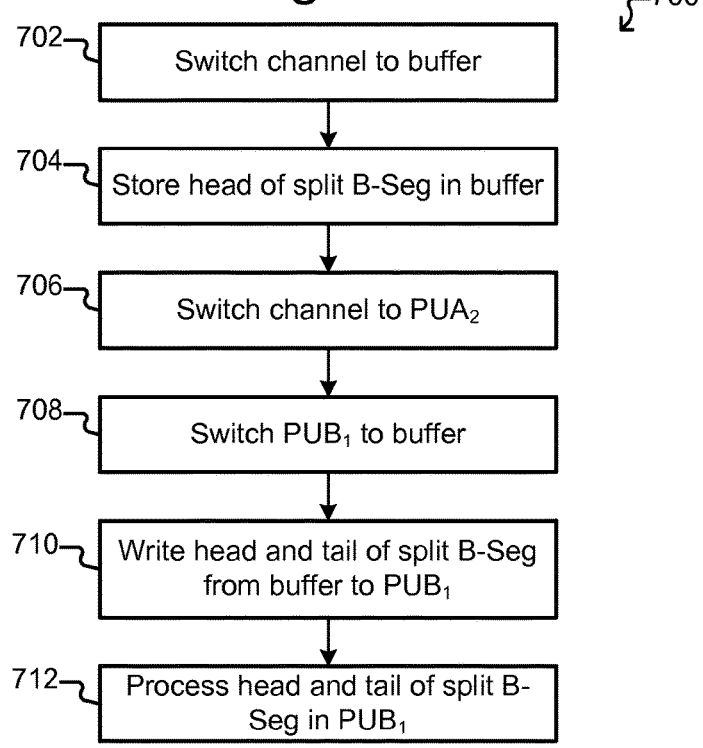
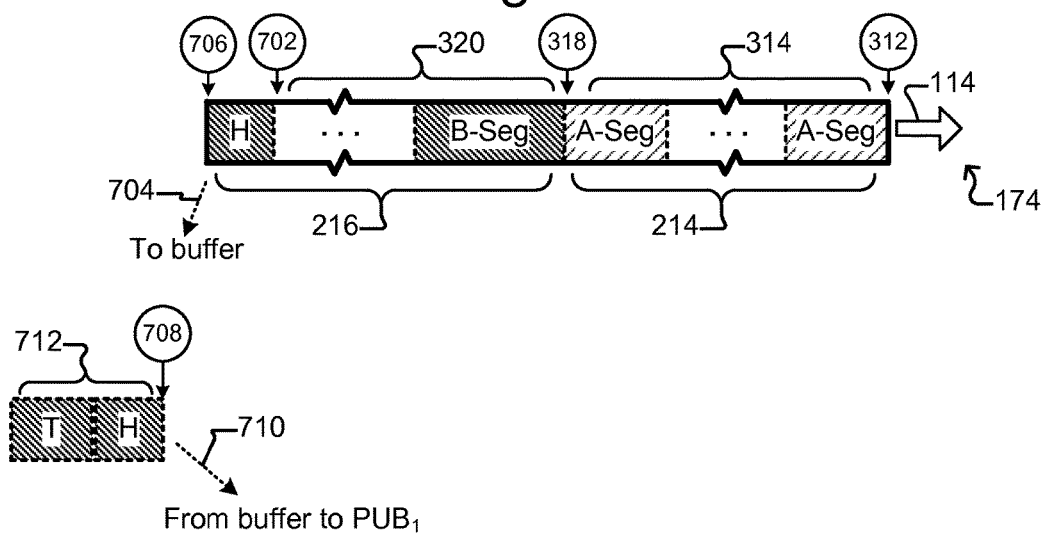

COMBINING AND PROCESSING AS A WHOLE PORTIONS OF A ORDERED SEGMENT OF DATA ELEMENTS SPLIT BETWEEN TWO COMMUNICATIONS CHANNELS

BACKGROUND

Data can be transferred in blocks of ordered data elements between devices in communications, computing, data processing, or other electronics systems. There can be advantages to transferring such data blocks in parallel streams of the data elements. Embodiments of the present invention are directed to improvements in systems and methods for receiving and processing a block of data in parallel streams.

SUMMARY

In some embodiments, a method can provide ordered data elements of a data block to a B processing module configured to process ones of the ordered data elements in B-segments each consisting of b and only b of the data elements. The method can include receiving the ordered data elements of the data block in parallel streams over parallel communication channels and, as a tail of a split B-segment of the ordered data elements in one of the streams is received at an output of one of the channels, storing the ordered data elements of the tail in a buffer. Then, as a head of the split B-segment of the ordered data elements in another of the streams is received at an output of another of the channels, the method can provide to the B processing module as a whole B-segment the head of the split B-segment followed by the tail of the split B-segment from the buffer.

In some embodiments, an apparatus for processing ordered data elements of a data block can include a B processing module, parallel communication channels, a buffer, and a controller. The B processing module can be configured to process ones of the ordered data elements in B-segments each consisting of b and only b of the data elements, and the parallel communication channels can each be configured to receive a stream of the ordered data elements of the data block. The controller can be configured to: as a tail of a split B-segment of the ordered data elements in one of the streams is received at an output of one of the channels, store the ordered data elements of the tail in the buffer; and as a head of the split B-segment of the ordered data elements in another of the streams is received at an output of another of the channels, provide to the B processing module as a whole B-segment the head of the split B-segment followed by the tail of the split B-segment from the buffer.

In some embodiments, a controller can be configured to perform a method of providing ordered data elements of a data block, as the data elements are received in parallel streams over parallel communication channels, to a B processing module configured to process ones of the ordered data elements in B-segments each consisting of b and only b of the data elements. The method can include: as a tail of a split B-segment of the ordered data elements in one of the streams is received at an output of one of the channels, storing the ordered data elements of the tail in a buffer; and as a head of the split B-segment of the ordered data elements in another of the streams is received at an output of another of the channels, providing to the B processing module as a whole B-segment the head of the split B-segment followed by the tail of the split B-segment from the buffer.

BRIEF DESCRIPTION OF THE DRAWINGS

FIG. 1 illustrates an example of a circuit for receiving and processing an ordered block of data elements in multiple input streams.

FIG. 2 shows an example configuration of an ordered block of data elements in which a segment of the data elements is split between two input streams.

FIG. 3A shows an example of a method for receiving and processing a stream of the data elements in which all of the data elements in the stream are to be processed in the same manner.

FIG. 3B shows an example of a method for receiving and processing a stream of data elements in which one section of the data elements in the stream are to be processed in one manner and another section of the data elements are to be processed in another manner.

FIG. 3C illustrates an example of a method for receiving and processing a stream of data elements all of which are to be processed in the same manner but in which a segment of the data elements is split between the stream and another stream.

FIG. 4 illustrates examples of timing of steps of the methods of FIGS. 3A-3C as those methods receive and process two consecutive data blocks.

Figure 5:
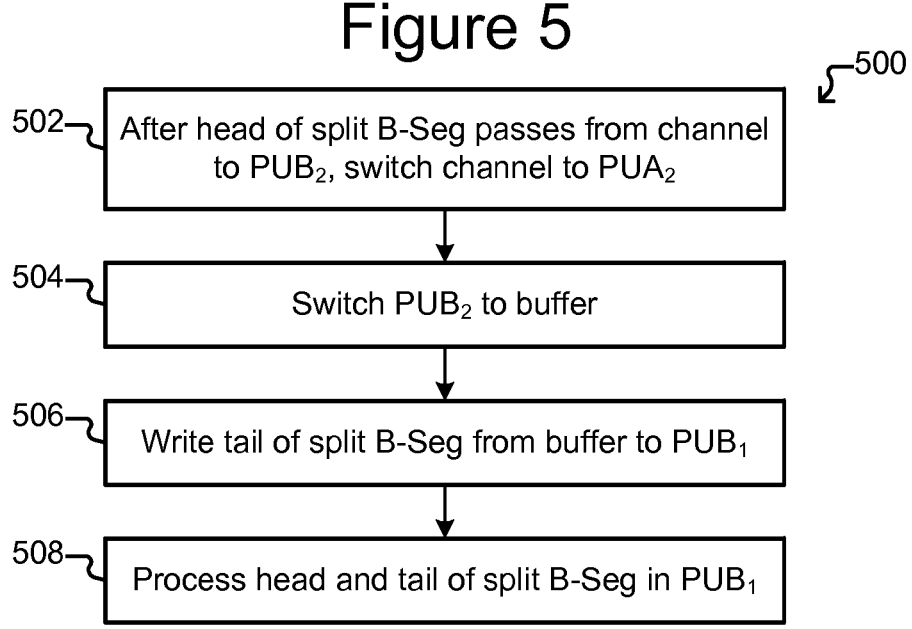

The method of FIG. 5 is an example implementation of the step in FIG. 3B of processing the head and tail of a split data segment as a whole segment.

Figure 6:
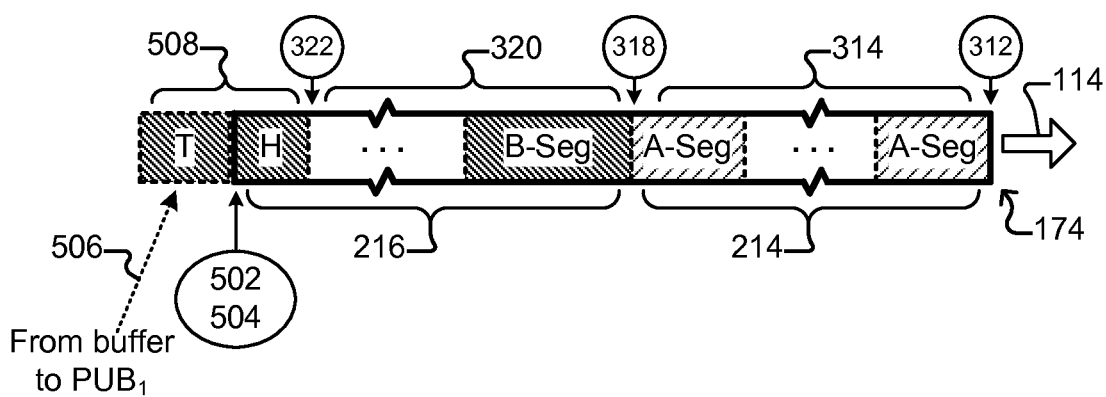

FIG. 6 shows examples of timing of steps of the method of FIG. 5.

FIG. 7 is another example of a method for implementing the step in FIG. 3B of processing the head and tail of a split data segment as a whole segment.

FIG. 8 illustrates examples of timing of steps of the method of FIG. 7.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one. The term "disposed" encompasses within its meaning "located."

As used herein, "data element" means a unit of data. Examples of a data element include a binary bit, an m-ary symbol that represents multiple binary bits, or the like. Another example of a data element is an estimated value (e.g., a log likelihood ratio (LLR)) of a binary bit in an encoded block of binary bits received at a communications receiver. Such an estimated value can itself be represented by multiple binary bits.

An ordered data block as used herein consists of data elements in a particular order. Similarly, a sub-block, section, or segment (as those terms are used herein) of an ordered data block comprises data elements in the order of the data block.

FIG. 1 illustrates an example of a data block processing circuit 100 according to some embodiments of the invention. As shown, the circuit 100 can comprise communication channels 102, 104, 106 (three are shown but there can be fewer or more), a switch module 120, processing modules 124, 126 (two are shown but there can be fewer or more), a buffer 160, and a controller 162. The communication channels 102, 104, 106 can carry a sequence of ordered data blocks 170, 180, 190 (three are shown but there can be fewer or more) of data elements in multiple parallel streams. (Data blocks 170, 180, 190 are ordered data blocks as that terms is defined above.) Each data block 170, 180, 190 can comprise multiple sub-blocks of the data elements of the block, and each processing module 124, 126 can be configured to process one of the sub-blocks in segments of a particular number of the data elements. The switch module 120 can switch outputs 112, 114, 116 of the channels 102, 104, 106 between inputs 132, 134, 136, 138 of processing modules 124, 126. The controller 162 can control the switch module 120 by, for example, directing segments of the sub-blocks to the proper processing module 124, 126 and buffering in the buffer 160 the heads, middle section or sections, and/or tails of segments of a sub-block that are split between channels 102, 104, 106. As will be seen, the circuit 100 shown in FIG. 1 can process substantially continuously the blocks 170, 180 190 as the blocks are received at channel outputs 112, 114, 116.

The communication channels 102, 104, 106 can carry each data block 170, 180, 190 in parallel streams of the data elements of the block. In the example illustrated in FIG. 1, there are three parallel channels 102, 104, 106, which can thus carry each block 170, 180, 190 in three parallel streams. For example, a first group of the data elements in block 170 can be in a stream 172 on channel 102, a second group of the data elements in block 170 can be in a substantially parallel stream 174 in channel 104, and a third group of the data elements in block 170 can be in another substantially parallel stream 176 in channel 106. As mentioned, each data block 170, 180, 190 can be an ordered block, meaning that the data elements of the block are in a particular order. The order of the data elements in block 170 can be from right to left in each of streams 172, 174, 176, and from stream 172 to stream 174 to stream 176. Block 180 of ordered data elements can be similarly distributed between streams 182, 184, 186, and the ordered data elements of block 190 can be distributed between streams 192, 194, 196. Although the data blocks 170, 180, 190 are illustrated in FIG. 1 as divided into three streams, each data block can instead be divided into fewer or more streams. For example, the data elements of each block 170, 180, 190 can be divided into as many parallel streams as there are channels 102, 104, 106.

Channel 102 can be an example of the yet another of the channels referred to in some of the claims. Channels 104 and 106 can similarly be, respectively, examples of the another of the channels and the one of the channels referred to in the claims. Likewise, stream 172 can be an example of the yet another of the streams, stream 174 can be an example of the another of the streams, and stream 176 can be an example of the one of the streams recited in some of the claims.

As noted, each data block 170, 180, 190 can comprise multiple sub-blocks each of which is to be processed by a different one of processing modules 124, 126. In the example shown in FIG. 1, each data block 170, 180, 190 comprises a first sub-block A that is to be processed by processing module PMA 124 and a second sub-block B that is to be processed by processing module PMB 126. As also noted, the circuit 100 can alternatively have more than two processing modules 124, 126. Each block 170, 180, 190 can thus comprise more than two sub-blocks A, B. Indeed, there can be as many different processing modules 124, 126 as there are sub-blocks A, B in a data block 170, 180, 190.

Each of communication channels 102, 104, 106 can comprise a distinct physical medium. For example, each of channels 102, 104, 106 can each comprise a different electrical cable, waveguide, or similar physical medium. Alternatively, the communication channels 102, 104, 106 can comprise the same physical medium (e.g., ambient air, space, an electrical cable, a waveguide, or the like) but be defined by a multiplexing scheme such as frequency divisional multiplexing, phase division multiplexing, spread spectrum techniques, or the like. As yet another example, the communication channels 102, 104, 106 can be defined by different modulation schemes. For example, the data elements in one channel (e.g., channel 102) can be modulated in accordance with a first modulation scheme, the data elements in another channel (e.g., channel 104) can be modulated in accordance with a second modulation scheme that is different than the first modulation scheme, and the data elements in yet another channel (e.g., channel 106) can be modulated in accordance with a third modulation scheme that is different than the first and second modulation schemes. Examples of suitable modulation schemes include high-order modulation schemes such as bit interleaved coded modulation (BICM).

Processing module PMA 124 can be configured to perform one or more processes, functions, or the like on data elements of sub-block A of each of the data blocks 170, 180, 190 as the data blocks are received over channels 102, 104, 106. Moreover, processing module PMA 124 can be configured to perform its one or more processes, functions, or the like on segments of a fixed or minimal number of the data elements. For example, processing module PMA 124 can be configured to perform the one or more processes or functions on an A-segment of sub-block A, where an A-segment can consist of a specific number or a minimal number of the data elements of sub-block A. In some embodiments, an A-segment consists of a and only a ordered, contiguous data elements of sub-block A. In other embodiments, an A-segment comprises at least a ordered, contiguous data elements of sub-block A. In either of the foregoing embodiments, a can be an integer greater than or equal to one. For example, a can be any integer between one and one thousand inclusive. As another example, a can be greater than or equal to any integer between one and one thousand inclusive.

Examples of processes or functions processing module PMA 124 can be configured to perform on an A-segment of the data elements of sub-block A include any one or more of the following: one or more reorderings of the data elements of the A-segment such that the order of the data elements in an A-segment output from processing module PMA 124 is different than the order in the A-segment as input into processing module PMA 124; a parallel-to-parallel conversion of the data elements in an A-segment such that the parallel width of data elements in an A-segment output from processing module PMA 124 is different than the parallel width of the data elements input into processing module PMA 124; any digital filtering including finite impulse filtering (FIR), infinite impulse filtering (IIR), equalizing, or match filtering; log-likelihood calculations; interference calculations; and/or the like.

Generally similar to processing module PMA 124, processing module PMB 126 can be configured to perform one or more processes, functions, or the like on data elements of sub-block B of each of the data blocks 170, 180, 190 as those blocks are received over channels 102, 104, 106. Moreover, processing module PMB 126 can be configured to perform the one or more processes or functions on segments of a fixed or minimal number of data elements. For example, processing module PMB 126 can be configured to perform its one or more processes or functions on a B-segment of sub-block B, where a B-segment consists of a specific number or a minimal number of the data elements in sub-block B. In some embodiments, a B-segment consists of b and only b ordered, contiguous data elements of sub-block B. In other embodiments, a B-segment comprises at least b ordered, contiguous data elements of sub-block B. In either of the foregoing embodiments, b can be an integer greater than or equal to one. For example, b can be any integer between one and one thousand inclusive. As another example, b can be greater than or equal to any integer between one and one thousand inclusive.

In any given implementation of the circuit 100 of FIG. 1, the integer b can be the same as or different than the integer a. Thus, in some embodiments, the A-segments processed by processing module PMA 124 can be a different size than the B-segments processed by processing module PMB 126. In other embodiments, however, the A-segments and the B-segments can be the same size.

Examples of processes or functions processing module PMB 126 can be configured to perform on a B-segment of the data elements of sub-block B include any of the processes or functions mentioned above as examples of processes or functions that can be performed by processing module PMA 124 on an A-segment. In some embodiments, one or more (e.g., all) of the processes or functions processing module PMA 124 performs on A-segments can be different than one or more (e.g., all) of the processes or functions processing module PMB 126 performs on B-segments. In other embodiments, one or more (e.g., all) of the processes or functions processing module PMA 124 performs on A-segments can be the same as one or more (e.g., all) of the processes or functions processing module PMB 126 performs on B-segments. For example, processing module PMA 124 can be configured to perform a parallel-to-parallel conversion and a first reordering of the data elements in each of the A-segments of sub-block A, and processing module PMB 126 can be configured to perform the same parallel-to-parallel conversion but a second reordering of the data elements in each of the B-segments of sub-block B, where the second reordering is different than the first reordering.

As illustrated in FIG. 1, processing module PMA 124 can comprise multiple processing units $PUA_1$ 142, $PUA_2$ 144 (two are shown but there can be fewer or more) each of which is configured to perform the processing or functions of processing module PMA 124 on a different A-segment. Similarly processing module PMB 126 can comprise multiple processing units $PUB_1$ 146, $PUB_2$ 148 (two are shown but there can be fewer or more) each of which is configured to perform the processing or functions of processing module PMB 126 on a different B-segment. For example, processing module PMA 124 can comprise a processing unit $PUA_1$ 142, $PUA_2$ 144 for each channel (e.g., 102, 104) expected to carry data elements of sub-block A. Similarly, processing module PMB 126 can comprise a processing unit $PUB_1$ 146, $PUB_2$ 148 for each channel (e.g., 104, 106) expected to carry data elements of sub-block B.

One or both processing modules 124, 126, including one or more of the processing units $PUA_1$ 142, $PUA_2$ 144, $PUB_1$ 146, $PUB_2$ 148 can be configured as a processor (e.g., processor 164 as discussed below) operating in accordance with machine executable instructions stored in a memory (e.g., like memory 166 as discuss below), digital logic (e.g., like digital logic 168 as discussed below), or the like. Regardless of how configured, processing module PMA 124 (including any or all of its processing units $PUA_1$ 142, $PUA_2$ 144) and processing module PMB 126 (including any or all of its processing units $PUB_1$ 146, $PUB_2$ 148) are "circuits" as that term is used herein.

Switch module 120 can be configured to selectively connect each of the outputs 112, 114, 116 of channels 102, 104, 106 to the buffer 160 or one of the inputs 132, 134, 136, 138 to processing module PMA 124 or processing module PMB 126. The switch module 120 can also be configured to selectively connect the buffer 160 to one of the inputs 132, 134, 136, 138 to processing module PMA 124 or processing module PMB 126. The switch module 120 can be controlled via a control input 122. The switch module 120 can comprise digital logic circuitry, analog circuitry, or a combination of the foregoing.

Buffer 160 can comprise any digital memory device to which data elements received at one or more of the outputs 112, 114, 116 of channels 102, 104, 106 can be written and stored and from which those data elements can later be read and provided to one or more of the inputs 132, 134, 136, 138 to processing module PMA 124 and/or processing module PMB 126. Examples of such a memory device include a random access memory (RAM); a memory comprising flip flops, data registers, or the like; or any similar memory device.

Controller 162 can be configured to, among other things, control the state of the switch module 120 and thus selectively set and change connections among the outputs 112, 114, 116 of the channels 102, 104, 106; the buffer 160; and the inputs 132, 134, 136, 138 to processing modules 124, 126 as discussed above. Controlling read operations to and write operations from the buffer 160 are other examples of functions the controller 162 can be configured to perform.

The controller 162 can comprise a processor 164 and a digital memory 166. The processor 164 can be, for example, a digital processor, computer, an optical processor, or the like, and the digital memory 166 can be a digital memory for storing data and machine executable instructions (e.g., software, firmware, microcode, or the like) as non-transitory data or signals. The processor 164 can be configured to operate in accordance with such machine executable instructions stored in the digital memory 166. Alternatively or in addition, the controller 162 can comprise digital circuitry 168 and/or analog circuitry (not shown). For example, digital circuitry 168 can comprise hardwired digital logic circuits, one or more programmed programmable digital logic device (e.g., a programmed field programmable gate array device), and/or the like. Regardless, the controller 162 can be configured to perform all or part of any method (e.g., method 300 of FIG. 3A, method 310 of FIG. 3B, method 330 of FIG. 3C, method 500 of FIG. 5, and/or method 700 of FIG. 7) or any step of a method, function, act, or the like discussed herein.

Regardless of how the controller 162 is configured (e.g., as a processor 164 operating in accordance with machine executable instructions stored in the memory 166, as hard wired digital logic circuitry or a programmed logic device, or a combination of the foregoing), the controller 162 is a "circuit" as that term is used herein.

FIG. 2 illustrates an example of a structure of streams 172, 174, 176 of data elements of block 170 that gives rise to an issue that can be addressed by the circuit 100 of FIG. 1. Each of data blocks 180, 190 and data blocks (not shown) that follow those blocks can be similarly structured. In FIG. 2, data block 170 is illustrated as comprising two sub-blocks A and B of data elements divided among three parallel streams 172, 174, 176. As noted, data block 170 can alternatively comprise more than two sub-blocks A and B and/or two or more than three parallel streams. Each stream 172, 174, 176 can consist entirely of data elements of one of the sub-blocks or, alternatively, data elements of more than one sub-block. Hereinafter a stream consisting only of data elements of one of the sub-blocks is sometimes referred to as a "homogeneous" stream, and a stream consisting of data elements of more than one of the sub-blocks is sometimes referred to as a "heterogeneous" stream. In the example illustrated in FIG. 2, streams 172 and 176 are examples of homogeneous streams, and stream 174 is an example of a heterogeneous stream.

In the example illustrated in FIG. 2, stream 172 is shown consisting of a penultimate section 212 of sub-block A in which the data elements are received at the output 112 of channel 102 (not shown in FIG. 2) in order from right to left (as oriented in FIG. 2). In the example illustrated in FIG. 2 in which stream 172 is the first stream (i.e., the stream that carries the first data elements of the block 172) of data elements of block 172, section 212 is also the first section of sub-block A. As noted, however, data block 170 can comprise more than three streams 172, 174, 176 and thus can comprise one or more additional streams of data elements of sub-block A that are ordered in the block 170 ahead of the data elements in stream 172. For this reason, section 212, although illustrated in FIG. 2 as the first section of data elements of data block 170, is referred to more generically as the penultimate section of data elements of sub-block A.

Stream 174 is shown consisting of a last section 214 of data elements of sub-block A followed by a first section 216 of data elements of sub-block B, which are similarly received at the output 114 of channel 104 (not shown in FIG. 3) in order from right to left. Stream 176 is illustrated as consisting of a second section 218 of data elements of sub-block B, which are likewise received at the output 116 of channel 106 (not shown in FIG. 2) in order from right to left.

In the example shown in FIG. 2, the penultimate section 212 and last section 214 of sub-block A comprise whole A-segments 222 of the data elements of sub-block A. The first section 216 of sub-block B comprises one or more whole B-segments 232 of the data elements of sub-block B, but the first section 216 ends with the head H of a partial B-segment 232*a*. The tail T of the partial B-segment 232*b* is at the beginning of the second section 218 of sub-block B. The tail T is followed in the second section 218 by whole B-segments 232 of the data elements of sub-block B. In some embodiments, the head H of the split B-segment 232*b* can consist of the first z number of the b ordered data elements of the entire split B-segment 232*a*, 232*b* where z is an integer between 1 and b. The tail T can consist of the next b-z number of the b ordered data elements of the entire split B-segment 232*a*, 232*b*.

As noted, streams 172, 174, 176 are received at the outputs 112, 114, 116 substantially in parallel. The tail T of the split B-segment 232*b* is thus received at the output 116 of channel 106 in time before the head H of the split B-segment 232*a* is received at the output 114 of channel 104. Because processing module 126 processes the data elements of the second sub-block B, stream 176 cannot simply be connected to processing module PMB 126 and the data elements processed in B-segments as the data elements arrive at the output 116 of channel 106. FIGS. 3A-3C illustrate examples of methods 300, 310, 330 by which the controller 162 can operate the circuit 100 to address the foregoing and/or other issues. The methods 300, 310, 330 can be parallel methods.

FIG. 3A illustrates an example of a method 300 for processing the data elements in a homogeneous stream that does not include a partial segment. In the example illustrated in FIG. 2, method 300 can be applicable to stream 172.

Method 300 can begin at step 302 with the output 112 of channel 102 connected to an input (e.g., 132) of a processing unit PUA (e.g., $PUA_1$ 142) of processing module PMA 124. If the output 112 is not already connected to the input 132, the switch module 120 can make the connection at step 302. Then as data elements in stream 172 arrive at the output 112 of channel 102, the data elements flow to the input 132 of the processing unit $PUA_1$ 142, which can process the data elements in A-segments. The controller 162 can control the switch module 120 to perform step 302 as needed, and the processing unit $PUA_1$ 142 can perform step 304.

FIG. 3B shows an example of a method 310 for processing the data elements in a heterogeneous stream that ends with the head of a partial segment. In the example illustrated in FIG. 2, method 310 can be applicable to stream 174.

Method 310 can begin at step 312 with the output 114 of channel 104 connected to an input (e.g., 134) of another processing unit PUA (e.g., $PUA_2$ 144) of processing module PMA 124. If the output 114 is not already connected to the input 134, the switch module 120 can make the connection at step 312. Then as data elements of the last section 214 of sub-block A in stream 174 arrive at the output 114 of channel 104, the data elements flow to the input 134 of processing unit $PUA_2$ 144, which can process the data elements in A-segments. The controller 162 can control the switch module 120 to perform step 312 as needed, and the processing unit $PUA_2$ 144 can perform step 314.

Step 314 can be repeated until the end of sub-block A arrives at the output 114 of channel 104. Once the last A-segment of sub-block A is received at the output 114 of channel 104 and passes to the input 134 of the processing unit $PUA_2$ 144 at step 318, the output 114 can be switched from the input 134 of the processing unit $PUA_2$ 144 to the input (e.g., 136) of a processing unit (e.g., $PUB_1$ 146) of processing module PMB 126. Then as data elements of the first section 216 of sub-block B in stream 174 arrive at the output 114 of channel 104, the data elements flow to the input 136 of the processing unit PUB$_1$ 146, which can process the data elements in B-segments 232 at step 320. The controller 162 can determine when criterion of step 316 is met. For example, the controller 162 can be configured (e.g., programmed) with the length of the last section 214 of sub-block A in stream 174 and can thereby identify at step 316 the end of sub-block A in stream 174. The controller 162 can perform step 318 by controlling the switch module 120 to connect the output 114 of channel 104 to the input 136 of processing unit PUB$_1$, which can then perform step 320.

Step 320 can process whole B-segments of the data elements of the first section 216 of sub-block B as the data elements are received at the output 114 of channel 104 and pass to the input 136 of processing unit PMA$_1$ 146. Step 320 can be repeated until the head of the split B-segment 232a at the end of stream 174 begins to arrive at the output 114 of channel 104. (See step 322.) Once the head H of the split B-segment 232a is reached in stream 174 (e.g., begins to be received at the output 114 of channel 104), the head H can be combined with the tail T of the split B-segment 232b from the buffer 160 and provided to the input 136 of the processing unit PUB$_1$ 146, which can process the tail T and the head H of the split B-segment 232a, 232b as a whole B-segment at step 324. (As discussed below, the method 330 of FIG. 3C stores the head H of the split B-segment 232b in the buffer 160.) The controller 162 can determine when criterion of step 322 is met. For example, the controller 162 can be configured (e.g., programmed) with the length of the first section 216 of sub-block B to the head H of the partial B-segment 232a in stream 174 and can thereby identify at step 322 the beginning of the head H. There are any number of ways to perform step 324. Methods 500 and 700 of FIGS. 5 and 7 (discussed below) are examples.

FIG. 3C illustrates an example of a method 330 for processing the data elements in a homogeneous stream that starts with the tail of a partial segment. In the example illustrated in FIG. 2, method 330 can be applicable to stream 176.

The method 330 can begin at step 332 with the output 116 of channel 106 connected to the buffer 160. If the output 116 is not already connected to the buffer 160, the switch module 120 can make the connection at step 332. Then as data elements of the tail T of the split B-segment 232b at the beginning of stream 176 arrive at the output 116 of channel 106, the tail T is stored in the buffer 160 at step 334. The controller 162 can control the switch module 120 to perform step 332 as needed and the buffer 160 to perform step 334.

The output 116 of channel 106 can then be switched from the buffer 160 to the input (e.g., 138) of another processing unit (e.g., PUB$_2$ 148) of processing module PMB 126. Then as data elements of the second section 218 of sub-block B that follow the tail T in stream 176 arrive at the output 116 of channel 106, the data elements flow to the input 138 of the processing unit PUB$_2$ 148, which can process the data elements that follow the tail T in stream 176 in B-segments at step 338. The controller can perform step 336 by controlling the switch module 120 to connect the output 116 of channel 106 to the input 138 of processing unit PUB$_2$ 148, which can then perform step 338.

Methods 300, 310, 330 can operate in parallel to receive and process a block of data elements in multiple parallel streams. Methods 300, 310, 330 can then be repeated to receive and process another block of data elements and so on such that a long sequence of data blocks can be received and processed each block being received and processed by parallel repetition of methods 300, 310, 330. FIG. 4 highlights examples of timing of steps of those processes as block 170 and then block 180 of FIG. 1 are received and processed. In FIG. 4, the data elements of each of streams 172, 174, 176 are received at a corresponding channel output 112, 114, 116 from right to left (in the orientation of FIG. 4), and then the data elements of each of streams 182, 184, 186 of data block 180 are similarly received at a corresponding channel output 112, 114, 116 from right to left.

As the beginnings of each stream 172, 174, 176 of block 170 start to be received at the outputs 112, 114, 116 of channels 102, 104, 106 (not shown in FIG. 4):

method 300 connects the output 112 of channel 102 to the input 132 of processing unit PUA$_1$ 142 at step 302;

substantially in parallel, method 310 connects the output 114 of channel 104 to the input 134 of processing unit PUA$_2$ 144 at step 312; and substantially in parallel, method 330 connects the output 116 of channel 106 to the buffer 160 at step 332.

Then, as a first A-segment 222 of data elements of sub-block A arrives in stream 172 at the output 112 of channel 102, a first A-segment 222 of data elements of sub-block A arrives in stream 174 at the output 114 of channel 104, and the tail T of the split B-segment 232b arrives at the output 116 of channel 106:

method 300 processes the first A-segment 222 of data elements of sub-block A from stream 172 in processing unit PUA$_1$ 142 at step 304;

substantially in parallel, method 310 processes the first A-segment 222 of data elements of sub-block A from stream 174 in processing unit PUA$_2$ 144 at step 314; and substantially in parallel, method 330 stores the tail T of the split B-segment 232b from stream 176 in the buffer 160 at step 334 and then switches the output 116 of channel 106 to the input 138 of processing unit PUB$_2$ 148 at step 336.

Then, as A-segments 222 of data elements of sub-block A continue to arrive in stream 172 at the output 112 of channel 102, A-segments 222 of data elements of sub-block A continue to arrive in stream 174 at the output 114 of channel 104, and B-segments 232 arrive at the output 116 of channel 106:

method 300 continues to process arriving A-segments 222 of data elements of sub-block A from stream 172 in processing unit PUA$_1$ 142 at step 304;

substantially in parallel, method 310 continues to process arriving A-segments 222 of data elements of sub-block A from stream 174 in processing unit PUA$_2$ 144 at step 314; and substantially in parallel, method 330 processes arriving B-segments 232 of data elements of sub-block B from stream 176 in processing unit PUB$_2$ 148 at step 338.

Then, as A-segments 222 of data elements of sub-block A continue to arrive in stream 172 at the output 112 of channel 102, the end of the A-segments 222 of data elements of sub-block A is reached in stream 174 at the output 114 of channel 104, and B-segments 232 in stream 176 continue to arrive at the output 116 of channel 106:

method 300 continues to process the arriving A-segments 222 of data elements of sub-block A from stream 172 in processing unit PUA$_1$ 142 at step 304;

substantially in parallel, method 310 switches the output 114 of channel 104 from the input 134 of processing unit PUA$_2$ 144 to the input 136 of processing unit PUB$_1$ 146 at step 318; and substantially in parallel, method 330 continues to process arriving B-segments 232 of data elements of sub-block B from stream 176 in processing unit $PUB_2$ 148 at step 338.

Then, as A-segments 222 of data elements of sub-block A continue to arrive in stream 172 at the output 112 of channel 102, B-segments 232 of data elements of sub-block B arrive in stream 174 at the output 114 of channel 104, and B-segments 232 continue to arrive in stream 176 at the output 116 of channel 106:

method 300 continues to process the arriving A-segments 222 of data elements of sub-block A from stream 172 in processing unit $PUA_1$ 142 at step 304;

substantially in parallel, method 310 processes arriving B-segments 232 of data elements of sub-block B from stream 174 in processing unit $PUB_1$ 146 at step 320; and substantially in parallel, method 330 continues to process arriving B-segments 232 of data elements of sub-block B from stream 176 in processing unit $PUB_2$ 148 at step 338.

Then, as A-segments 222 of data elements of sub-block A continue to arrive in stream 172 at the output 112 of channel 102, the head H of the partial B-segment 232a of data elements of sub-block B at the end of stream 174 is reached (e.g., the last whole B-segment 232 in the first section 216 arrives at the output 114 of channel 104 and passes to the input 136 of processing unit $PUB_1$ 146), and B-segments 232 in stream 176 continue to arrive at the output 116 of channel 106:

method 300 continues to process the arriving A-segments 222 of data elements of sub-block A from stream 172 in processing unit $PUA_1$ 142 at step 304;

substantially in parallel, method 310 processes the head H of the split B-segment 232a from stream 174 and the tail T of the split B-segment 232b from buffer 160 as a whole B-segment in processing unit $PUB_1$ 146 at step 324; and substantially in parallel, method 330 continues to process arriving B-segments 232 of data elements of sub-block B from stream 176 in processing unit $PUB_2$ at step 338.

Substantially parallel performance of methods 300, 310, 330 can thus receive and process a data block (e.g., 170). As shown in FIG. 4, the methods 300, 310, and 330 can then be repeated to similarly receive and process a next data block (e.g., 180) in a sequence of data blocks received over channels 102, 104, 106. The methods 300, 310, and 330 can be similarly repeated for each such data block (e.g., 190) in the sequence of data blocks.

The methods 300, 310, 330 are but examples. For example, similar methods or a combination of the foregoing methods can be utilized to process a homogeneous stream that ends with the head of a split segment and a heterogeneous stream that starts with the tail of a split segment.

As mentioned, method 500 of FIG. 5 and method 700 of FIG. 7 are examples of ways to perform step 324 of FIG. 3B, which as illustrated in FIGS. 3B and 4, can be performed following step 322 of FIG. 3B. In the examples illustrated in FIG. 5 and FIG. 7, the head H and tail T of the split segment 232a, 232b of block 170 are processed in processing unit $PUB_1$ 146 generally at the same time that processing unit $PUA_2$ 144 is processing A-segments 232 from the first section 214 of the next block 180. This can facilitate processing each block 170, 180, 190 with minimal delay between the blocks. For example, it is estimated that the methods 300, 310, 330 of FIGS. 3A-3B can process a sequence of blocks like blocks 170, 180, 190 substantially continuously, that is, with minimal (e.g., less than ten, five, three, two, one percent) delay between the blocks. The foregoing percentages refer to a delay time between processing two sequential blocks 170, 180, 190 in the sequence divided by the time to process one of the blocks in the sequence. Methods 500 and 700 are but examples of ways to implement step 324 of FIG. 3B, and other implementations can be utilized to perform step 324.

As shown in FIG. 5, method 500 can, after the head H of the split B-segment 232a in stream 174 passes from the output 114 of channel 104 to the input 136 of processing unit $PUB_1$ 146, do the following: at step 502, switch the output 114 of channel 104 from the input 136 of processing unit $PUB_1$ 146 to the input 134 of processing unit $PUA_2$ 134; and at step 504, connect the input 136 of processing unit $PUB_1$ 146 to the buffer 160. At step 506, the method 500 can write the tail T of the split B-segment 232b from the buffer 160 to the input 136 of processing unit $PUB_1$ 146. The tail T of the split B-segment 232b can thus follow the head H into processing unit $PUB_1$ 146. Processing unit $PUB_1$ 146 can then process the head H and tail T of the split B-segment 232a, 232b as a whole B-segment at step 508. The controller 162 can control the buffer 160 and switch module 120 to perform steps 502, 504, 506.

FIG. 6 shows stream 174 from FIG. 4 and illustrates examples of timing of steps 502-508. After all of the B-segments 232 in the first section 216 of sub-block B pass from the output 114 of channel 104 to the input 136 of processing unit $PUB_1$ as step 320 of FIG. 3B is repeated, the head H of the split B-segment 232a arrives at the output 114 of channel 104 (see step 322 of FIG. 3B) and passes from the output 114 to the input 136 of processing unit $PUB_1$ 146. Once the end of the head H has been received at the output 114 and passed to the input 136, the method 500 performs steps 502 and 504. Processing unit $PUA_2$ 144 is then connected to channel 104 (see step 312 of FIG. 3B), and method 310 begins to receive and process stream 184 on channel 104 of the next block 180. In the meantime, processing unit $PUB_1$ 146, which was disconnected from channel 104 at step 318, is connected to and receives the tail T of the split B-segment 232b from the buffer 160 at step 506 and processes the head H and the tail T of the split B-segment 232a, 232b of block 170 as a whole B-segment at step 508.

As shown in FIG. 7, method 700 can store the head H of the split B-segment 232a in the buffer 160, connect channel 104 to processing unit $PUA_2$ 144 for processing the A-segments 222 in the last section 214 of sub-block A in stream 184 of the next block 180, and write the head H and the tail T of the split B-segment 232a, 232b of block 170 from the buffer 160 to processing unit $PUB_1$ 146, which can then process the head H and tail T before processing unit $PUB_1$ 146 is connected back to channel 104 at step 318 during receipt of the next block 180.

That is, as the head H of the split B-segment 232a in stream 174 reaches the output 114 of channel 104, method 700 can switch the output 114 to the buffer 160 at step 702, and store the head H in the buffer 160 at step 704. Method 700 can then switch the output 114 of channel 104 to processing unit $PUA_2$ 134 at step 706. At steps 708 and 710, method 700 can connect the input 136 of processing unit $PUB_1$ 146 to the buffer 160, and then write the head H and tail T of the split B-segment 232a, 232b of block 170 from buffer 160 to processing unit $PUB_1$ 146, which can process the head H and tail T as a whole B-segment. The controller 162 can control the buffer 160 and/or switch module 120 to perform steps 702-710.

FIG. 8 shows stream 174 from FIG. 4 and illustrates examples of timing of steps 702-712. After the B-segments 232 of the first section 216 of sub-block B are received at the output 114 of channel 104 and pass to the input 136 of processing unit $PUB_1$ as step 320 of FIG. 3B is repeated, method 700 performs step 702 and then step 704 to write the head H of the split B-segment 232a as it is arrives at the output 114 of channel 104 to the buffer 160. Processing unit $PUA_2$ 144 is then connected to channel 104 (see step 312 of FIG. 3B) at step 706, and method 310 can begin to receive and process stream 184 on channel 104 of the next block 180. In the meantime, processing unit $PUB_1$ 146, which is now disconnected from channel 104 (see step 706) and will not be used to process B-segments 232 from stream 184 in channel 104 until step 318 in FIG. 3B, is connected to (step 708) and receives the head H and the tail T of the split B-segment 232b from the buffer 160 at step 710 and processes at step 712 the head H and the tail T as a whole B-segment.

In the examples illustrated in FIG. 5 and FIG. 7, the head H and tail T of the split segment 232a, 232b of block 170 are processed in processing unit $PUB_1$ 146 generally at the same time that processing unit $PUA_2$ 144 is processing A-segments 232 from the last section 214 of sub-block A of the next data block 180.

As mentioned, the data blocks 170, 180, 190 can be any block of ordered data elements. For example, the data blocks 170, 180, 190 can compose a message received at a communications receiver (e.g., a radio frequency (RF) receiver) (not shown) from a distant communications transmitter (e.g., an RF transmitter) (not shown). The message can be encoded with a block error correction code that allows a decoder (not shown) at the receiver (not shown) to detect and correct errors in the message. Sub-block A of each block 170, 180, 190 can comprise, for example, an information portion of the message, and sub-block B can comprise a parity portion utilized to detect and correct errors in the block. U.S. patent application Ser. No. 14/805,155 (filed Jul. 21, 2015), which is assigned to the same assignee as the instant application, discloses an example of a permutation apparatus for receiving blocks of data each comprising an information portion of a transmitted message and a parity portion for detecting and corrected errors in the information portion. The aforementioned U.S. patent application Ser. No. 14/805,155 (hereinafter the '155 Application) is incorporated herein in its entirety by reference. Some embodiments of the inventions disclosed in the present application can be utilized with the '155 Application.

For example, embodiments of the inventions disclosed in the present application can be utilized with the pre-decoding circuit 1700 illustrated in FIG. 17 of the '155 Application to receive the streams 1742, 1752, 1762, 1772 of data elements and provide and process the data elements in those streams to the information permutation circuit 1706 and parity permutation circuit 1708 of FIG. 17 of the '155 Application. The streams 1742, 1752, 1762, 1772 in FIG. 17 of the '155 Application can thus be examples of an equal number of the streams 172, 174, 176 in the instant application; the information permutation circuit 1706 in FIG. 17 of the '155 Application can be an example of the processing module A 124 in the instant application; and the parity permutation circuit 1708 in FIG. 17 of the '155 Application can be an example of the processing module B 126 in the instant application. Embodiments of the present invention including the switch module 120, buffer 160, and controller 162 can thus be utilized in the pre-decoding circuit 1700 of FIG. 17 of the '155 Application to receive and provide the information data elements in the streams 1742, 1752, 1762, 1772 to the information permutation circuit 1706 and parity data elements in those streams 1742, 1752, 1762, 1772 to the parity permutation circuit 1708. The per-decoder circuit 1700 of FIG. 17 of the '155 application, however, is but an example of an application of embodiments of the invention disclosure in the instant application.

Although specific embodiments and applications of the invention have been described in this specification, these embodiments and applications are exemplary only, and many variations are possible.

We claim:

1. A method for processing ordered data elements of a data block that is split among multiple parallel streams, the method comprising:

receiving the data block in parallel streams over parallel communication channels, the data block including a first sub-block and a second sub-block that each includes multiple segments of ordered data elements, the second sub-block having a first set of segments that are included in a first stream of the parallel streams and a second set of segments that are included in a second stream of the parallel streams, the first stream being received via a first communication channel and the second stream being received via a second communication channel such that the first set of segments are received via the first communication channel and the second set of segments are received via the second communication channel;

as the data block is received, routing the segments of the first sub-block to a first processing module and the segments of the second sub-block to a second processing module;

detecting that the second stream that is received via the second communication channel includes a tail of a split segment in the second set of segments;

storing the tail of the split segment in a buffer rather than routing the tail to the second processing module; and in response to detecting that the first stream that is received via the first communication channel includes a head of the split segment, retrieving the tail of the split segment from the buffer and providing, to the second processing module, the head of the split segment that was received via the first communication channel and the tail of the split segment that was received via the second communication channel as a whole segment.

2. The method of claim 1, wherein:

the tail is at a beginning of the second stream, and the head is at an end of the first stream.

3. The method of claim 2, further comprising:

after providing, to the second processing module, the head and the tail of the split segment as a whole segment, switching an output of the second communication channel to the first processing module;

receiving, at the output of the second communication channel, a beginning of a stream of a second data block; and processing, with the first processing module, the segments of the beginning of the stream of the second data block.

4. The method of claim 1, wherein routing the segments of the first sub-block to a first processing module and the segments of the second sub-block to a second processing module comprises switching outputs of the parallel communications channels.

5. The method of claim 1, wherein each segment included in the second sub-block has the same number of data elements.

6. The method of claim 1, wherein the tail is received at an output of the second communication channel before the head is received at an output of the first communication channel.

7. The method of claim 1, wherein each segment included in the first sub-block has the same number of data elements.

8. The method of claim 1, wherein the first stream also includes segments of the first sub-block.

9. The method of claim 8, wherein the segments of the first sub-block included in the first stream are received before the segments of the second sub-block that are included in the first stream.

10. The method of claim 9, wherein the parallel streams include a third stream that includes segments of the first sub-block.

11. The method of claim 10, wherein the third stream includes segments of only the first sub-block, the first stream includes segments of both the first and the second sub-blocks, and the second stream includes segments of only the second sub-block.

12. The method of claim 1, wherein:
the first processing module reorders, according to a first reordering, the ordered data elements of each segment of the first data block,
the second processing module reorders, according to a second reordering, the ordered data elements of each segment of the second data block, and
the first reordering is different than the second reordering.

13. The method of claim 1, wherein each segment in the first sub-block has a same first number of data elements and each segment in the second sub-block has a same second number of data elements, the first number being different from the second number.

14. The method of claim 1, wherein providing, to the second processing module, the head and the tail of the split segment as a whole segment comprises:
storing the head of the split segment in the buffer, and
writing the head and the tail from the buffer to the second processing module.

15. An apparatus for processing ordered data elements of a data block that is split among multiple stream, the apparatus comprising:
a first processing module configured to process segments of ordered data elements of a first sub-block of the data block;
a second processing module configured to process ordered data elements of a second sub-block of the data block;
parallel communication channels each configured to receive a stream of segments of the data block including a first stream that includes a first set of segments of the second sub-block and a second stream that includes a second set of segments of the second sub-block such that the first set of segments of the second sub-block are received via a first communication channel of the parallel communication channels and the second set of segments of the second sub-block are received via a seond communication channel of the parallel communication channels;
a buffer; and
a controller configured to:
route the segments of the first sub-block to the first processing module and the segments of the second sub-block to the second processing module;
detect that the second stream that is received via the second communication channel includes a tail of a split segment in the second set of segments;
storing the tail of the split segment in the buffer rather than routing the tail to the second processing module; and
in response to detecting that the first stream that is received via the first communication channel includes a head of the split segment, retrieving the tail of the split segment from the buffer and providing, to the second processing module, the head of the split segment that was received via the first communication channel and the tail of the split segment that was received via the second communication channel as a whole segment.

16. The apparatus of claim 15, wherein:
the tail is at a beginning of the second stream, and
the head is at an end of the first stream.

17. The apparatus of claim 16, wherein the controller is further configured to:
after providing, to the second processing module, the head and the tail of the split segment as a whole segment, switch an output of the second communication channel to the first processing module.

18. The apparatus of claim 15, wherein the controller is configured to route the segments of the first sub-block to the first processing module and the segments of the second sub-block to the second processing module by switching outputs of the parallel communications channels.

19. The apparatus of claim 15, wherein each segment included in the second sub-block has the same number of data elements.

20. The apparatus of claim 15, wherein the tail is received at an output of the second communication channel before the head is received at an output of the first communication channel.

21. The apparatus of claim 15, wherein each segment included in the first sub-block has the same number of data elements.

22. The apparatus of claim 15, wherein the first stream also includes segments of the first sub-block.

23. The apparatus of claim 22, wherein the segments of the first sub-block included in the first stream are received before the segments of the second sub-block that are included in the first stream.

24. The apparatus of claim 23, wherein the parallel streams include a third stream that includes segments of the first sub-block.

25. The apparatus of claim 24, wherein the third stream includes segments of only the first sub-block, the first stream includes segments of both the first and the second sub-blocks, and the second stream includes segments of only the second sub-block.

26. The apparatus of claim 15, wherein:
the first processing module is configured to reorder, according to a first reordering, the ordered data elements of each segment of the first data block,
the second processing module is configured to reorder, according to a second reordering, the ordered data elements of each segment of the second data block, and
the first reordering is different than the second reordering.

27. The apparatus of claim 15, wherein each segment in the first sub-block has a same first number of data elements and each segment in the second sub-block has a same second number of data elements, the first number being different from the second number.

28. The apparatus of claim 15, wherein the controller is configured to provide, to the second processing module, the head and the tail of the split segment as a whole segment by:
  storing the head of the split segment in the buffer, and writing the head and the tail from the buffer to the second processing module.

29. A method for processing ordered data elements of a data block that is split among multiple parallel streams, the method comprising:
  receiving the data block in parallel streams over parallel communication channels, the data block including a first sub-block and a second sub-block that each includes multiple segments of ordered data elements, the first sub-block having a first set of segments that are included in a first stream of the parallel streams and a second set of segments that are included in a second stream of the parallel streams, the second sub-block having a first set of segments that are included in the second stream and a second set of segments that are included in a third stream of the parallel streams, the first stream being received via a first communication channel, the second stream being received via a second communication channel, and the third stream being received via a third communication channel such that the first set of segments of the first sub-block are received via the first communication channel, the second set of segments of the first sub-block and the first set of segments of the second sub-block are received via the second communication channel and the third set of segments of the second sub-block are received via the third communication channel;
  as the data block is received via the first, second and third communication channels, routing each segment of the first sub-block to a first processing module and each segment of the second sub-block to a second processing module;
  detecting that the third stream that is received via the third communication channel includes a tail of a split segment of the second sub-block;
  storing the tail in a buffer rather than routing the tail to the second processing module; and
  in response to detecting that the second stream that is received via the second communication channel includes a head of the split segment, retrieving the tail of the split segment from the buffer and providing, to the second processing module, the head of the split segment that was received via the second communication channel and the tail of the split segment that was received via the third communication channel as a whole segment.

30. The method of claim 29, wherein the second set of segments of the first sub-block are received before the first set of a segments of the second sub-block.

31. The method of claim 29, wherein the tail is received before the head.

32. The method of claim 29, wherein the first processing module includes a first processing unit and a second processing unit, and wherein routing each segment of the first sub-block to the first processing module comprises:
  routing the first set of segments of the first sub-block to the first processing unit and routing the second set of segments of the first sub-block to the second processing unit.

33. The method of claim 32, wherein at least some of the first set of segments of the first sub-block are routed to the first processing unit at the same time as at least some of the second set of segments of the first sub-block are routed to the second processing unit.

34. The method of claim 29, wherein the second processing module includes a first processing unit and a second processing unit, and wherein routing each segment of the second sub-block to the second processing module comprises:
  routing the second set of segments of the second sub-block to the first processing unit and routing the first set of segments of the second sub-block to the second processing unit.

35. The method of claim 34, wherein at least some of the first set of segments of the second sub-block are routed to the second processing unit at the same time as at least some of the second set of segments of the second sub-block are routed to the first processing unit.

36. The method of claim 29, wherein the tail is at a beginning of the third stream and the head is at an end of the second stream.

37. The method of claim 29, wherein each segment in the first sub-block has a same first number of ordered data elements and each segment in the second sub-block has a same second number of ordered data elements.

* * * * *